United States Patent
Ding et al.

(10) Patent No.: US 9,410,359 B2
(45) Date of Patent: *Aug. 9, 2016

(54) LOW-E PANELS AND METHODS FOR FORMING THE SAME

(71) Applicant: Intermolecular Inc., San Jose, CA (US)

(72) Inventors: Guowen Ding, San Jose, CA (US); Brent Boyce, Novi, MI (US); Tong Ju, Santa Clara, CA (US); Minh Huu Le, San Jose, CA (US); Phil Lingle, Temperance, MI (US); Daniel Schweigert, Fremont, CA (US); Yongli Xu, Plymouth, MI (US); Guizhen Zhang, Santa Clara, CA (US)

(73) Assignees: Intermolecular, Inc., San Jose, CA (US); Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,583

(22) Filed: Mar. 19, 2015

(65) Prior Publication Data

US 2015/0191965 A1 Jul. 9, 2015

Related U.S. Application Data

(63) Continuation-in-part of application No. 13/804,766, filed on Mar. 14, 2013.

(51) Int. Cl.
*B32B 15/04* (2006.01)
*B32B 17/06* (2006.01)
*E06B 3/67* (2006.01)
*C03C 17/36* (2006.01)

(52) U.S. Cl.
CPC ............... *E06B 3/6715* (2013.01); *C03C 17/36* (2013.01); *C03C 17/366* (2013.01); *C03C 17/3639* (2013.01); *C03C 17/3644* (2013.01); *C03C 17/3681* (2013.01); *Y10T 428/24975* (2015.01); *Y10T 428/265* (2015.01)

(58) Field of Classification Search
USPC ......... 428/426, 428, 432, 433, 434, 688, 689, 428/697, 699, 701, 702
See application file for complete search history.

(56) References Cited

U.S. PATENT DOCUMENTS

| | | | | |
|---|---|---|---|---|
| 5,821,001 A * | 10/1998 | Arbab | ..................... | C03C 17/36 428/623 |
| 2004/0009356 A1* | 1/2004 | Medwick | ................ | C03C 17/36 428/432 |
| 2007/0020465 A1* | 1/2007 | Thiel | ................. | B32B 17/10036 428/428 |
| 2007/0081228 A1* | 4/2007 | Hartig | ..................... | C03C 17/36 359/359 |
| 2008/0311389 A1* | 12/2008 | Roquiny | ................. | C03C 17/36 428/336 |
| 2012/0225304 A1* | 9/2012 | Imran | ..................... | C03C 17/36 428/433 |
| 2012/0225317 A1* | 9/2012 | Imran | ..................... | C03C 17/36 428/630 |
| 2014/0017472 A1* | 1/2014 | Coster | ............... | B32B 17/10036 428/219 |

FOREIGN PATENT DOCUMENTS

WO    WO2012140098    * 10/2012

* cited by examiner

*Primary Examiner* — Lauren R Colgan

(57) ABSTRACT

Embodiments provided herein describe low-e panels and methods for forming low-e panels. A transparent substrate is provided. A low-e stack is formed above the transparent substrate. Each of the layers of the low-e stack are formed to have a specific thickness to tune the performance characteristics of the low-e panel.

11 Claims, 7 Drawing Sheets

|  |  |  | Min. Color Change | |
|---|---|---|---|---|
|  |  |  | AC | HT |
| Monolithic Optics (Ill 'C', 2 deg obs) | T | Y (%) | 76.56 | 76.86 |
| | | a* | -5.06 | -3.3 |
| | | b* | 1.83 | 2.74 |
| | Rg | Y (%) | 6.26 | 6.68 |
| | | a* | 1 | 0.48 |
| | | b* | -3.18 | -1.66 |
| | Rf | Y (%) | 4.51 | 5.24 |
| | | a* | 5.75 | 4.62 |
| | | b* | -3.14 | 2.28 |
| | Rg(45deg) | Y (%) | 8.65 | 9.14 |
| | | a* | 3.73 | 1.79 |
| | | b* | -0.64 | 1.36 |
| | A[vis] (100-TT-Rf) | | 18.93 | 17.9 |
| IGU Optics (Ill 'C', 2 deg obs) | T | Y (%) | 69.4 | 69.7 |
| | | a* | -5.52 | -3.81 |
| | | b* | 1.85 | 2.77 |
| | Rg | Y (%) | 11.1 | 11.5 |
| | | a* | -1.58 | -1.16 |
| | | b* | -1.65 | -0.22 |
| | Rf | Y (%) | 11.9 | 12.4 |
| | | a* | 2.05 | 1.67 |
| | | b* | -1.76 | 0.65 |
| HT - AC | Rg ΔE* | | 1.63 | |
| | T ΔE* | | 1.95 | |
| NFRC | LSG | | 2.30 | 2.24 |

FIG. 3

|  |  |  | spec | AC Max Tvis |
|---|---|---|---|---|
| Monolithic Optics (Ill °C, 2 deg obs) | T | Y (%) |  | 74.87 |
|  |  | a* | (-6,0) | -4.75 |
|  |  | b* | < 6 | 2.55 |
|  | Rg | Y (%) |  | 7.46 |
|  |  | a* | (-4,2) | -2.43 |
|  |  | b* | (-8,-1) | -6.64 |
|  | Rf | Y (%) |  | 5.44 |
|  |  | a* | (-10,10) | 3.37 |
|  |  | b* | (-10,10) | -7.78 |
|  | Rg(45deg) | Y (%) |  | 9.47 |
|  |  | a* | (-4,2) | 1.48 |
|  |  | b* | (-8,-1) | -3.37 |
|  | A[vis] (100-TT-Rf) |  |  | 19.69 |
| IGU Optics (Ill °C, 2 deg obs) | T | Y (%) | > 60 | 67.9 |
|  |  | a* |  | -5.23 |
|  |  | b* |  | 2.49 |
|  | Rg | Y (%) | < 15 | 12.1 |
|  |  | a* |  | -3.72 |
|  |  | b* |  | -4.23 |
|  | Rf | Y (%) | < 20 | 12.6 |
|  |  | a* |  | 1.1 |
|  |  | b* |  | -4.2 |
| NFRC | Tvis (%) |  |  | 68 |
|  | Tsol (%) |  |  | 27.3 |
|  | SHGC(2) |  |  | 29.5 |
|  | Uval |  |  | 0.235 |
|  | LSG(2) |  | >=2.3 | 2.3 |

LOW-E PANELS AND METHODS FOR FORMING THE SAME

CROSS-REFERENCE TO RELATED APPLICATIONS

This is a Continuation-In-Part Application of U.S. patent application Ser. No. 13/804,766, filed on Mar. 14, 2013, which is herein incorporated by reference for all purposes.

TECHNICAL FIELD

The present invention relates to low-e panels. More particularly, this invention relates to low-e panels with novel materials and methods for forming such Low-e panels.

BACKGROUND OF THE INVENTION

Low emissivity, or low-e, panels are often formed by depositing a reflective layer (e.g., silver), along with various other layers, onto a transparent (e.g., glass) substrate. The other layers typically include various dielectric and metal oxide layers, such as silicon nitride, tin oxide, and zinc oxide, to provide a barrier between the stack and both the substrate and the environment, as well as to act as optical fillers and improve the optical characteristics of the panel.

When used in, for example, windows, and depending on the particular environment (i.e., climate), it may be desirable for the low-e panels to allow visible light to pass through the window while blocking other types of solar radiation, such as infra-red. Such panels are often referred to as having a high light-to-solar gain (LSG) ratio.

Currently available low-e panels are able to achieve LSG ratios of 1.8, or even higher, by using coating with more than one reflective layer (i.e., "double silver" coatings, "triple silver" coatings, etc.) However, these coatings typically exhibit changes in, for example, optical performance (e.g., color) if they are exposed to a heat treatment, such as that often performed to temper the glass substrate. As a result, different coatings must be used depending on whether or not a heat treatment will subsequently be performed.

Some existing low-e panels, suitable for certain applications, exhibit little or no change in performance due to the heat treatment. However, these low-e panels typically only utilize a single reflective layer, and thus have relatively low LSG ratios (e.g., less than 1.5).

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which:

FIG. 3 is a table of data related to various performance characteristics for low-e panels according to some embodiments.

FIG. 5 is a table of data related to various performance characteristics for low-e panels according to some embodiments.

DETAILED DESCRIPTION

A detailed description of one or more embodiments is provided below along with accompanying figures. The detailed description is provided in connection with such embodiments, but is not limited to any particular example. The scope is limited only by the claims, and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

Some embodiments provide low-e panels, and methods for forming low-e panels, with very high LSG ratios (e.g., greater than 2.2), and which exhibit little or no performance/color change if heated. This is accomplished using "triple silver" coatings (i.e., with three silver layers) which include layers within the stack formed within specific thickness ranges.

In some embodiments, the stack is tuned in such a way to maximize the transmittance of visible light. In such embodiments, the thickness of several of the layers (e.g., the silver layers and the base layers) is reduced (i.e., compared to other embodiments). In some embodiments, the stack is tuned in such a way to minimize any color change that may occur during a heat treatment to temper the glass. In such embodiments, the thickness of several of the layers (e.g., the silver layers and the base layers) is increased (i.e., compared to the embodiments in which the transmittance of visible light is maximized).

Figure 1:
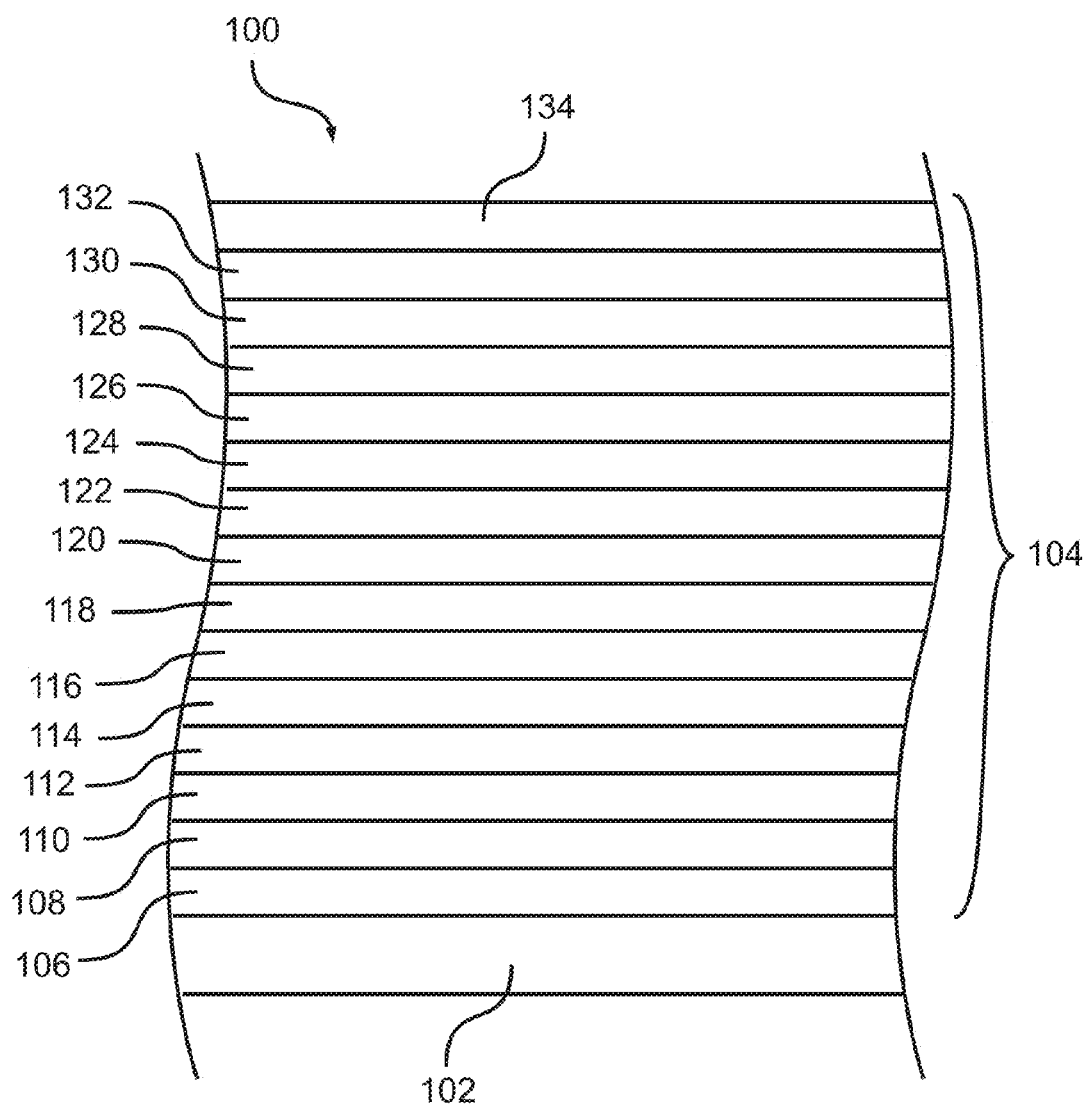
FIG. 1 is a cross-sectional side view of a low-e panel according to some embodiments.

FIG. 1 illustrates a low-e panel 100 according to some embodiments. The low-e panel 100 includes a transparent substrate 102 and a low-e stack 104 formed above the transparent substrate 102. The transparent substrate 102 in some embodiments is made of a low emissivity glass, such as borosilicate glass. However, in some embodiments, the transparent substrate 102 may be made of plastic or a transparent polymer, such as polyethylene terephthalate (PET), poly(methyl methacrylate) (PMMA), polycarbonate (PC), and polyimide (PI). The transparent substrate 102 has a thickness of, for example, between about 1 and about 10 millimeters (mm). In a testing environment, the transparent substrate 102 may be round with a diameter of, for example, about 200 or about 300 mm. However, in a manufacturing environment, the transparent substrate 102 may be square or rectangular and significantly larger (e.g., about 0.5-about 6 meters (m) across).

The low-e stack 104 includes a first (or lower) base layer 106, a first seed layer 108, a first reflective layer 110, a first barrier layer 112, a second (or middle) base layer 114, a second seed layer 116, a second reflective layer 118, a second barrier layer 120, a third (or upper) base layer 122, a third seed layer 124, a third reflective layer 126, a third barrier layer 128, a first over-coating layer 130, a second over-coating layer 132, and a protective layer 134. Exemplary details as to the functionality provided by each of the layers 106-134 are provided below.

The various layers in the low-e stack 104 may be formed sequentially (i.e., from bottom to top) above the transparent substrate 102 using, for example, a physical vapor deposition (PVD) and/or reactive sputtering processing tool. In some embodiments, the low-e stack 104 is formed above the entire substrate 102. However, in some embodiments, the low-e stack 104 may only be formed above isolated portions of the transparent substrate 102. Although the layers may be described as being formed "above" the previous layer (or the substrate), it should be understood that in some embodiments, each layer is formed directly on (and adjacent to) the previously provided/formed component (e.g., layer). In some embodiments, additional layers may be included between the layers, and other processing steps may also be performed between the formation of various layers.

The first base layer 106 is formed above the transparent substrate 102. The first base layer 106 may be made of a dielectric material that includes zinc and tin, such as zinc-tin oxide. Other suitable materials are, for example, titanium oxide, zinc oxide, tin oxide, and other metal alloy oxides, such as aluminum-tin oxide. The first base layer 106 may have a thickness of between about 12 nanometers (nm) and about 50 nm. In some embodiments, the thickness of the first base layer 106 is between about 20 nm and about 35 nm. However, in some embodiments the thickness of the first base layer 106 is between about 30 nm and about 35 nm. The first base layer 106 may be used to tune the optical properties (e.g., color, transmittance, etc.) of the low-e panel 100 as a whole, as well as to enhance silver nucleation.

The first seed layer 108 is formed above the first base layer 106. The first seed layer 110 is made of a metal oxide, such as zinc oxide. The first seed layer 108 may have a thickness of between about 2 nm and about 5 nm. In some embodiments, the thickness of the first seed layer 108 is between about 4 nm and about 5 nm. The first seed layer 108 may be used to enhance the deposition/growth of the first reflective layer 110 in the low-e stack 104 (e.g., enhance the crystalline structure and/or texturing of the first reflective layer 110) and increase the transmission of the stack 104 for anti-reflection purposes. In some embodiments, the first seed layer 108 (as well as the second and third seed layers 116 and 124) may be made of tin oxide or may not be included at all.

The first reflective layer 110 is formed above the first seed layer 108. In some embodiments, the first reflective layer 110 is made of silver. The first reflective layer 110 may have a thickness of between about 8 nm and about 20 nm. In some embodiments, the thickness of the first reflective layer 110 is between about 11 nm and about 13 nm. However, in some embodiments, the thickness of the first reflective layer 110 is between about 13 nm and about 14 nm. As is commonly understood, the first reflective layer 110 is used to reflect infra-red electro-magnetic radiation, thus reducing the amount of heat that may be transferred through the low-e panel 100.

The first barrier layer 112 is formed over the first reflective layer 110. The first barrier layer 112 may include, for example, nickel, titanium, niobium, or a combination thereof. For example, in some embodiments, the first barrier layer 112 is made of nickel-titanium-niobium oxide. The first barrier layer 111 may have a thickness of, for example, between about 1 nm and about 8 nm. In some embodiments, the thickness of the first barrier layer 112 is between about 4 nm and about 5 nm. The first barrier layer 112 is used, for example, to protect the first reflective layer 110 from the processing steps used to form the subsequent layers of the low-e stack 104 and to prevent any interaction of the material of the first reflective layer 110 with the materials of the other layers of the low-e stack 104, which may result in undesirable optical characteristics of the low-e panel 100, such as poor color performance.

Still referring to FIG. 1, the second base layer 114 is formed above the first barrier layer 112. The second base layer 114 may be made of the same material(s) as the first base layer 106 (e.g., zinc-tin oxide). The second base layer 114 may have a thickness of between about 40 nm and about 80 nm. In some embodiments, the thickness of the second base layer 114 is between about 40 nm and about 60 nm. However, in some embodiments, the thickness of the second base layer 114 is between about 65 nm and about 75 nm. As with the first base layer 106, the second base layer 114 may be used to tune the optical properties (e.g., color, transmittance, etc.) of the low-e panel 100 as a whole, as well as to enhance silver nucleation.

The second seed layer 116 is formed above the second base layer 114. The second seed layer 116 may be made of the same material(s) as the first seed layer 108 (e.g., zinc oxide). The second seed layer 116 may have a thickness of between about 2 nm and about 5 nm. In some embodiments, the thickness of the second seed layer 116 is between about 4 nm and about 5 nm. As with the first seed layer 108, the second seed layer 116 may be used to enhance the deposition/growth of the second reflective layer 118 in the low-e stack 104 (e.g., enhance the crystalline structure and/or texturing of the first reflective layer 110) and increase the transmission of the stack 104 for anti-reflection purposes.

The second reflective layer 118 is formed above the second seed layer 116.

The second reflective layer 118 may be made of the same material(s) as the first reflective layer 110 (e.g., silver). The second reflective layer 118 may have a thickness of between about 8 nm and about 20 nm. In some embodiments, the thickness of the second reflective layer 118 is between about 11 nm and about 13 nm. However, in some embodiments, the thickness of the second reflective layer 118 is between about 14 nm and about 15 nm. As with the first reflective layer 110, the second reflective layer 118 is used to reflect infra-red electro-magnetic radiation.

The second barrier layer 120 is formed above the second reflective layer 118. The second barrier layer 120 may be made of the same material(s) as the first barrier layer 112 (e.g., nickel-titanium-niobium oxide). The second barrier layer 120 may have a thickness of, for example, between about 1 nm and about 8 nm. In some embodiments, the thickness of the second barrier layer 120 is between about 4 nm and about 5 nm. Similar to the first barrier layer 112, the second barrier layer 120 may be used to protect the second reflective layer 118 from the processing steps used to form the subsequent layers of the low-e stack 104.

Still referring to FIG. 1, the third base layer 122 is formed above the second barrier layer 120. The third base layer 122 may be made of the same material(s) as the first base layer 106 and the second base layer 114 (e.g., zinc-tin oxide). The third base layer 122 may have a thickness of between about 40 nm and about 80 nm. In some embodiments, the thickness of the third base layer 122 is between about 40 nm and about 60 nm. However, in some embodiments, the thickness of the third base layer 122 is between about 65 nm and about 70 nm. As with the first base layer 106 and the second base layer 114, the third base layer 122 may be used to tune the optical properties (e.g., color, transmittance, etc.) of the low-e panel 100 as a whole, as well as to enhance silver nucleation.

The third seed layer 124 is formed above the third base layer 122. The third seed layer 124 may be made of the same material(s) as the first seed layer 108 and the second seed layer 116 (e.g., zinc oxide). The third seed layer 124 may have a thickness of between about 2 nm and about 5 nm. In some embodiments, the thickness of the third seed layer 124 is between about 4 nm and about 5 nm. As with the first seed layer 108 and the second seed layer 116, the third seed layer 124 may be used to enhance the deposition/growth of the third reflective layer 126 in the low-e stack 104 (e.g., enhance the crystalline structure and/or texturing of the third reflective layer 126) and increase the transmission of the stack 104 for anti-reflection purposes.

The third reflective layer 126 is formed above the third seed layer 124. The third reflective layer 126 may be made of the same material(s) as the first reflective layer 110 and the second reflective layer 118 (e.g., silver). The third reflective layer 126 may have a thickness of between about 8 nm and about 20 nm. In some embodiments, the thickness of the third reflective layer 126 is between about 13 nm and about 15 nm. However, in some embodiments, the thickness of the third reflective layer 126 is between about 16 nm and about 17 nm. As with the first reflective layer 110 and the second reflective layer 118, the third reflective layer 126 is used to reflect infra-red electro-magnetic radiation.

The third barrier layer 128 is formed above the third reflective layer 126. The third barrier layer 120 may be made of the same material(s) as the first barrier layer 112 and the second barrier layer 120 (e.g., nickel-titanium-niobium oxide). The third barrier layer 128 may have a thickness of, for example, between about 1 nm and about 8 nm. In some embodiments, the thickness of the third barrier layer 128 is between about 4 nm and about 5 nm. Similar to the first barrier layer 112 and the second barrier layer 120, the third barrier layer 128 may be used to protect the third reflective layer 126 from the processing steps used to form the subsequent layers of the low-e stack 104.

Still referring to FIG. 1, the first over-coating layer 130 is formed above the third barrier layer 128. The first over-coating layer 130 may be made of the same material(s) as the first base layer 106, the second base layer 114, and the third base layer 122 (e.g., zinc-tin oxide). The first over-coating layer 130 may have a thickness of between about 3 nm and about 30 nm. In some embodiments, the thickness of the first over-coating layer 130 is between about 10 nm and about 20 nm.

The second over-coating layer 132 is formed above the first over-coating layer 130. The second over-coating layer 132 may be made of the same material(s) as the first seed layer 108, the second seed layer 116, and the third seed layer 124 (e.g., zinc oxide). The second over-coating layer 132 may have a thickness of between about 2 nm and about 6 nm. In some embodiments, the thickness of the second over-coating layer 132 is between about 3 nm and about 6 nm.

The first and second over-coating layers 130 and 132 may be used to further tune the optical properties of the low-e panel 100 as a whole. Additionally, in some embodiments, the first and second over-coating layers 130 and 132 may enhance the LSG ratio of the low-e panel 100.

Still referring to FIG. 1, the protective (or capping) layer 134 is formed above the second over-coating layer 132. The protective layer 134 may be made of dielectric material, such as silicon nitride, and have a thickness of, for example, between about 10 nm and about 30 nm. The protective layer 134 may be used to provide additional protection for the lower layers of the stack 104 and further adjust the optical properties of the low-e panel 100. The protective layer 134 may also be considered to be an over-coating layer (i.e., a third over-coating layer).

One skilled in the art will appreciate that the embodiment depicted in FIG. 1 is a "triple silver" low-e panel (i.e., having three reflective/silver layers). However, in some embodiments, the low-e panel 100 (or the low-e stack 104) is formed as a "double silver," or even a "single silver," low-e panel (i.e., having two or one reflective/silver layers). In such embodiments, some of the layers in the low-e stack 104 may be removed (i.e., not formed). For example, in a double silver embodiment, the low-e stack 104 may not include the third base layer 122, the third seed layer 124, the third reflective layer 126, and the third barrier layer 128.

It should be noted that depending on the materials used, some of the layers of the low-e stack 104 may have some materials in common. For example, in some embodiments, the base layers 106, 114, and 122 and the first over-coating layer 130 are made of the same material (e.g., zinc-tin oxide). Similarly, in some embodiments, the seed layers 108, 116, and 124 and the second over-coating layer 132 are made of the same material (e.g., zinc oxide).

Although not shown in FIG. 1, it should be understood that an additional protective layer may be formed between the transparent substrate 102 and the first base layer 106. This additional (or lower) protective layer may be made of the same material (e.g., silicon nitride) as the (upper) protective layer 132 and have a thickness of, for example, between about 10 nm and 30 nm. This additional protective layer may protect the other layers in the stack 104 from any elements which may otherwise diffuse from the transparent substrate 102 and may be used to tune the optical properties (e.g., transmission) of the low-e stack 104 and/or the low-e panel 100 as a whole.

It should also be understood that the low-e panel 100 may be a portion of (or installed in) a larger, more complex device or system, such as a low-e window. Such a window may include multiple glass substrates (or panes), other coatings (or layers), such a thermochromic coating formed on a different pane than the low-e stack, and various barrier or spacer layers formed between adjacent panes.

Figure 2:
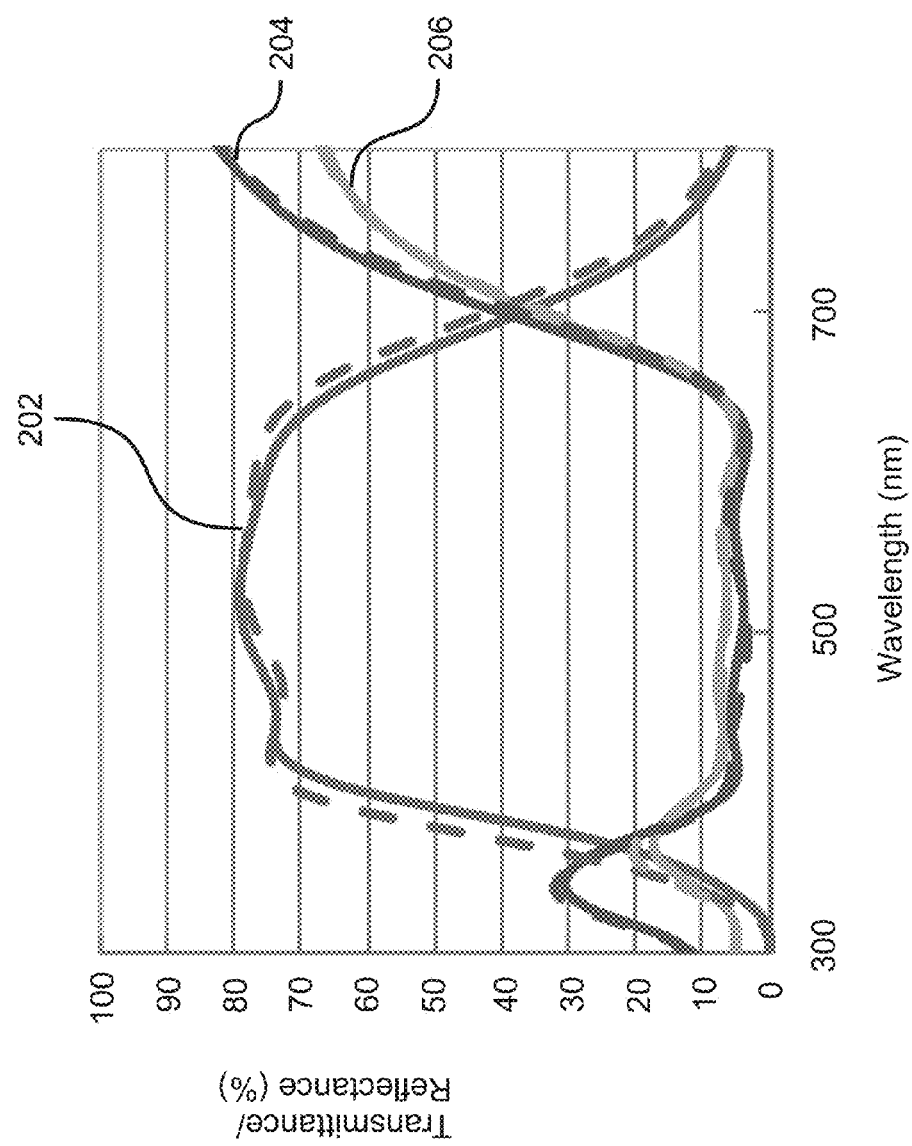
FIG. 2 is a graph depicting transmittance and reflectance for low-e panels according to some embodiments.

In some embodiments, the low-e stack 104 (and/or the low-e panel 100 as a whole) is "tuned" (e.g., by utilizing layers within the low-e stack 104 with specific thickness ranges) to minimize any color change and change in visible light transmittance that may occur during a heat treatment to temper the glass, as well as to provide a high LSG ratio. An example of such an embodiment includes a first base layer 106 with a thickness of about 30-35 nm, a second base layer 114 with a thickness of about 65-75 nm, and a third base layer 122 with a thickness of about 65-70 nm, along with a first, second, and third reflective layers 110, 118, and 126 with thicknesses of about 13-14 nm, 14-15 nm, and 16-17 nm, respectively. FIG. 2 graphically illustrates the transmittance (or transmission) and reflectance (or reflection), both before and after heat treatment, for such low-e panels.

Referring now to FIG. 2, line group 202 depicts transmittance, with the solid line in line group 202 depicting the transmittance before heat treatment (i.e., as-coated) and the dashed line in line group 202 depicting the transmittance after heat treatment. As shown, the transmittance for visible light (i.e., 380-780 nm) is relative high, peaking at about 80%, both before and after heat treatment (i.e., the heat treatment changed transmittance very little).

Still referring to FIG. 2, line group 204 depicts reflectance for electro-magnetic radiation passing through the low-e panels from the side of the substrate with the low-e stack (i.e., the coating side). The solid line in line group 204 depicts this reflectance before heat treatment, and the dashed line depicts this reflectance after heat treatment. As shown, the reflectance for the coating side increases dramatically (to over 80%) for electro-magnetic radiation with wavelengths longer than that of visible light (i.e., greater than 780 nm) and is affected very little by the heat treatment. Line group 206 depicts reflectance for electro-magnetic radiation passing through the low-e panels from the side of the substrate opposite the low-e stack (i.e., the substrate (or glass) side). The solid line in line group 206 depicts this reflectance before heat treatment, and the dashed line depicts this reflectance after heat treatment. As shown, the reflectance for the substrate side, though not quite as high as the coating side, also increases dramatically for electro-magnetic radiation with wavelengths longer than that of visible light and is affected very little by the heat treatment.

Other characteristics of the low-e panels described herein which are tuned to minimize any color change and change in visible light transmittance that may occur during a heat treatment are shown in the table depicted in FIG. 3. "AC" indicates data for the as-coated low-e panels, and "HT" indicates data for the low-e panels after a high temperature treatment (e.g. tempering). Data are presented for both monolithic low-e panels (e.g., Monolithic Optics) and dual-pane low-e panels (e.g., IGU Optics). Due to the distribution of cones in the eye, the color observance may depend on the observer's field of view. Standard (colorimetric) observer is used, which was taken to be the chromatic response of the average human viewing through a 2 degree angle, due to the belief that the color-sensitive cones reside within a 2 degree arc of the field of view. Thus, the measurements are shown for the 2 degree Standard Observer.

The various characteristics listed in FIG. 3 will be understood and appreciated by one skilled in the art. For example, intensity of reflected visible wavelength light, (e.g., "reflectance") is defined for glass side "g" or for film side "f". Intensity from glass side reflectance, (e.g., $R_gY$), shows light intensity measured from the side of the glass substrate opposite the side of the coated layers. Intensity from film side reflectance, (e.g., $R_fY$), shows light intensity measured from the side of the glass substrate on which the coated layers are formed. Transmittance, (e.g., TY), shows light intensity measured for the transmitted light.

The color characteristics are measured and reported herein using the CIE LAB a*, b* coordinates and scale (i.e. the CIE a*b* diagram, Ill. CIE-C, 2 degree observer). In the CIE LAB color system, the "L*" value indicates the lightness of the color, the "a*" value indicates the position between magenta and green (more negative values indicate stronger green and more positive values indicate stronger magenta), and the "b*" value indicates the position between yellow and blue (more negative values indicate stronger blue and more positive values indicate stronger yellow).

Emissivity (E) is a characteristic of both absorption and reflectance of light at given wavelengths. It can usually represented as a complement of the reflectance by the film side, (e.g., $E=1-R_f$). For architectural purposes, emissivity values can be important in the far range of the infrared spectrum, (e.g., about 2,500-40,000 nm). Thus, the emissivity value reported here includes normal emissivity (EN), as measured in the far range of the infrared spectrum. Haze is a percentage of light that deviates from the incident beam greater than 2.5 degrees on the average.

Data are also shown for the difference between heat treated and as-coated low-e panels. The value $\Delta E^*$ (and $\Delta a^*$, $\Delta b^*$, $\Delta Y$) are important in determining whether or not upon heat treatment (HT) there is matchability, or substantial matchability, of the coated panels. For purposes of example, the term $\Delta a^*$, for example, is indicative of how much color value $a^*$ changes due to heat treatment. Also, $\Delta E^*$ is indicative of the change in reflectance and/or transmittance (including color appearance) in a coated panel after a heat treatment. $\Delta E^*$ corresponds to the CIELAB Scale L*, a*, b*, and measures color properties before heat treatment ($L_0^*, a_0^*, b_0^*$) and color properties after heat treatment ($L_1^*, a_1^*, b_1^{*T}$):

$$\Delta E^* = \sqrt{(\Delta L^*)^2 + (\Delta a^*)^2 + (\Delta b^*)^2}$$

where $\Delta L^* = L_1^* - L_0^*$, $\Delta a^* = a_1^* - a_0^*$, and $\Delta b^* = b_1^* - b_0^*$.

The color change of glass side reflection can be calculated as Rg $\Delta E^*$. The color change of light transmission can be calculated as T $\Delta E^*$, T|$\Delta a^*$| and T|$\Delta b^*$|. The luminance change of light transmission can be calculated as T $\Delta Y$.

Low-e panels (and/or low-e windows) utilizing the low-e stacks described above, particularly in a double (or triple) silver configuration, may demonstrate a high LSG ratio (e.g., greater than 1.9). Additionally, these low-e panels may show very little or no change in performance after undergoing a heat treatment. As indicated in FIG. 3, the low-e panels exhibit a low $R_g$ $\Delta E^*$ value (i.e. the color change on the glass side) when comparing the as-coated and the heat treated data (i.e., "HT-AC"). In particular, the low-e panels exhibit $R_g$ $\Delta E^*$ values of less than 2.00 (e.g., 1.63). Additionally, the low-e panels show very little color change of light transmitted (e.g., T $\Delta E^*$=1.95). The low-e panels also reflected a very neutral color from the glass side (e.g., a*<10 and b*<10). Further, the low-e panels demonstrated very high LSG ratios when used in a double pane window (e.g., 2.30 before heat treatment (or as-coated) and 2.24 after heat treatment).

Figure 4:
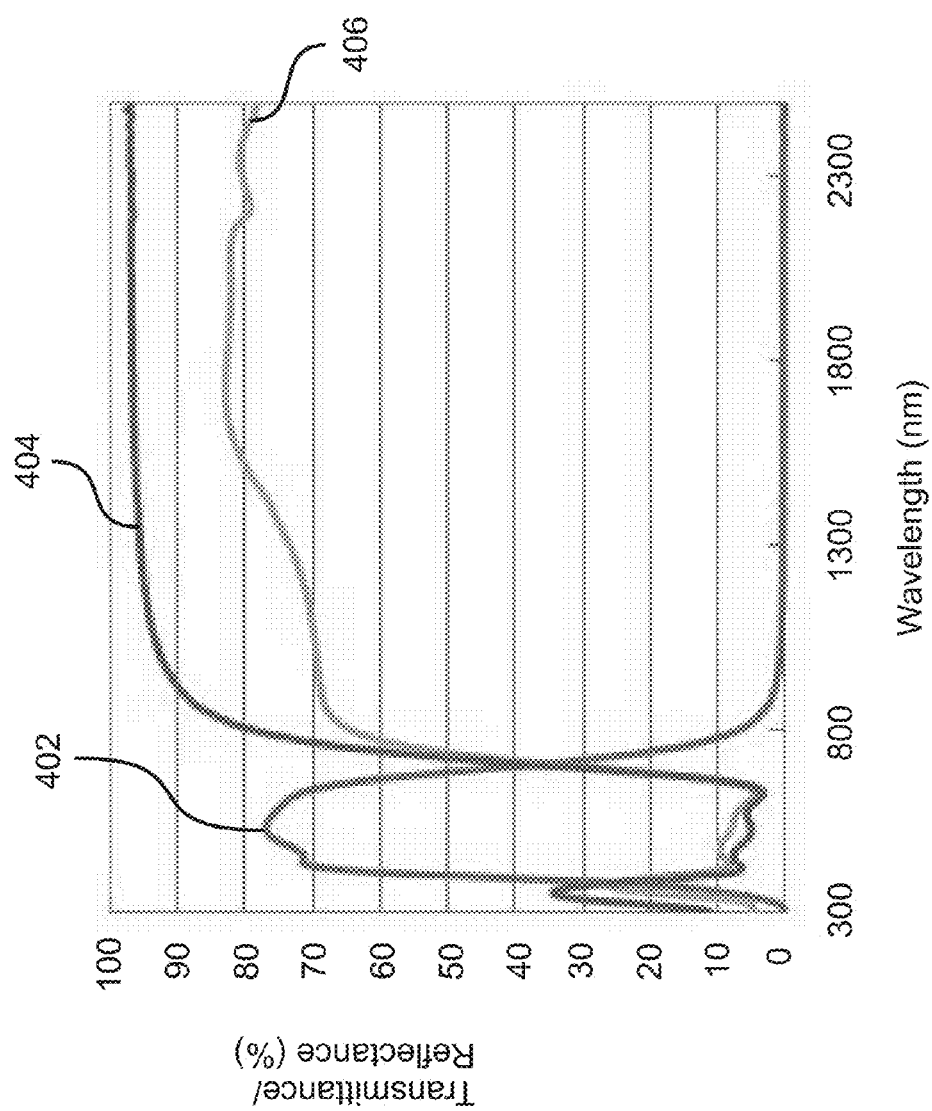
FIG. 4 is a graph depicting transmittance and reflectance for low-e panels according to some embodiments.

In some embodiments, the low-e stack 104 (and/or the low-e panel 100 as a whole) is tuned to maximize visible light transmission while still providing a LSG of greater than 2.2. An example of such an embodiment includes a first base layer 106 of about 20-35 nm, a second base layer 114 of about 40-60 nm, and a third base layer 122 of about 40-60 nm, along with a first, second, and third reflective layers 110, 118, and 126 with thicknesses of about 11-13 nm, 11-13 nm, and 13-15 nm, respectively. FIG. 4 graphically illustrates the transmittance (or transmission) and reflectance (or reflection), both before heat treatment (i.e., as-coated), for such low-e panels.

Referring now to FIG. 4, line 402 depicts transmittance before heat treatment (i.e., as-coated). As shown, the transmittance for visible light (i.e., 380-780 nm) is relative high, peaking at about 80%. Line 404 depicts reflectance for electro-magnetic radiation passing through the low-e panels from the coating side. As shown, the reflectance for the coating side increases dramatically (to over 90%) for electro-magnetic radiation with wavelengths longer than that of visible light (i.e., greater than 780 nm) and is affected very little by the heat treatment. Line 406 depicts reflectance for electro-magnetic radiation passing through the low-e panels from the substrate side. As shown, the reflectance for the substrate side, though not quite as high as the coating side, also increases dramatically for electro-magnetic radiation with wavelengths longer than that of visible light and is affected very little by the heat treatment.

Other characteristics of the low-e panels described herein which are tuned to maximize visible light transmission while still providing a LSG of greater than 2.2 are shown in the table depicted in FIG. 5, which is similar to the table shown in FIG. 3. Of particular interest is that the overall visible light transmission for these low-e panels, when used in a double pane window, is very high (e.g., $T_{vis}$=68%), even when common, low cost glass substrates are used. The low-e panels also reflected a very neutral color from the glass side (e.g., a*<10 and b*<10). Further, the low-e panels demonstrated very high LSG ratios when used in a double pane window (e.g., 2.3 as-coated). These performance characteristics are particularly interesting considering they were all (i.e., $T_{vis}$=68%, neutral color, and LSG ratio of 2.3) achieved using a triple silver low-e coating on low cost glass.

As an additional benefit, in some embodiments, manufacturing costs may be minimized because many of the layers in the low-e stacks described herein utilize materials used in the other layers (e.g., niobium, zinc, tin, etc). As a result, the total number of targets that are required to form the low-e stacks may be reduced.

Figure 6:
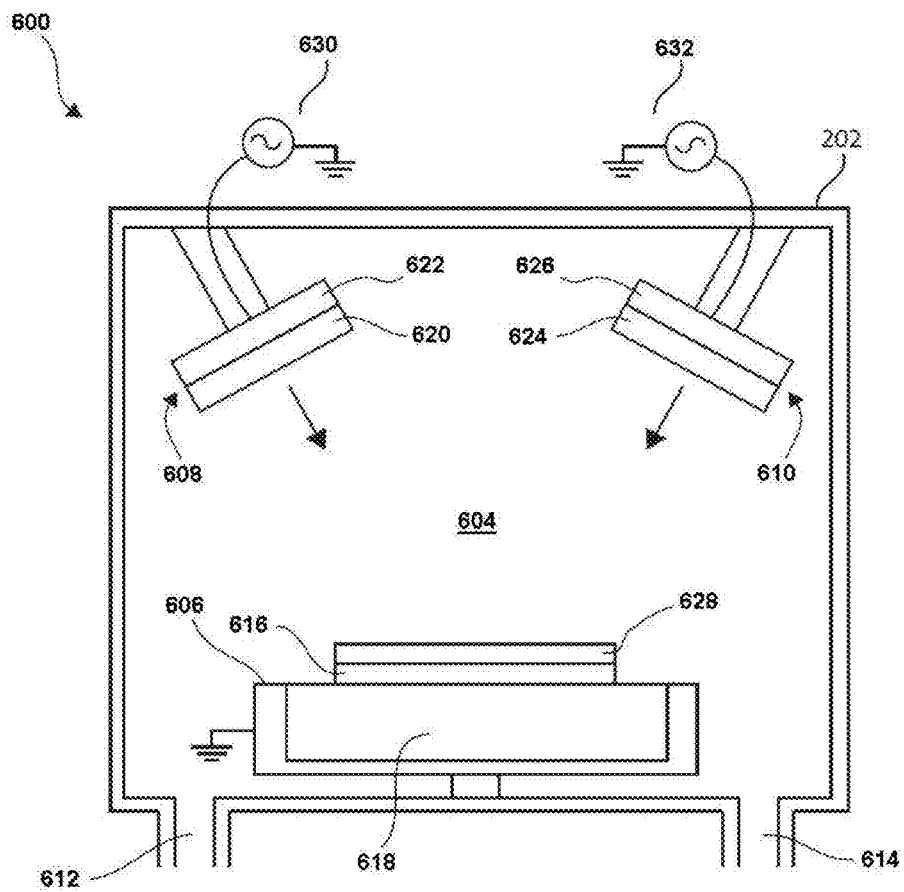
FIG. 6 is a simplified cross-sectional diagram illustrating a physical vapor deposition (PVD) tool according to some embodiments.

FIG. 6 provides a simplified illustration of a physical vapor deposition (PVD) tool (and/or system) 600 which may be used, in some embodiments to formed the low-e panels and/or the low-e stacks described above. The PVD tool 600 shown in FIG. 6 includes a housing 602 that defines, or encloses, a processing chamber 604, a substrate support 606, a first target assembly 608, and a second target assembly 610.

The housing 602 includes a gas inlet 612 and a gas outlet 614 near a lower region thereof on opposing sides of the substrate support 606. The substrate support 606 is positioned near the lower region of the housing 602 and in configured to support a substrate 616. The substrate 616 may be a round glass (e.g., borosilicate glass) substrate having a diameter of, for example, about 200 mm or about 300 mm. In other embodiments (such as in a manufacturing environment), the substrate 616 may have other shapes, such as square or rectangular, and may be significantly larger (e.g., about 0.5-about 6 m across). The substrate support 606 includes a support electrode 618 and is held at ground potential during processing, as indicated.

The first and second target assemblies (or process heads) 608 and 610 are suspended from an upper region of the housing 602 within the processing chamber 604. The first target assembly 608 includes a first target 620 and a first target electrode 622, and the second target assembly 610 includes a second target 624 and a second target electrode 626. As shown, the first target 620 and the second target 624 are oriented or directed towards the substrate 616. As is commonly understood, the first target 620 and the second target 624 include one or more materials that are to be used to deposit a layer of material 628 on the upper surface of the substrate 616.

The materials used in the targets 620 and 624 may, for example, include tin, zinc, tin, magnesium, aluminum, lanthanum, yttrium, titanium, antimony, strontium, bismuth, silicon, silver, nickel, chromium, niobium, or any combination thereof (i.e., a single target may be made of an alloy of several metals). Additionally, the materials used in the targets may include oxygen, nitrogen, or a combination of oxygen and nitrogen in order to form oxides, nitrides, and oxynitrides. Additionally, although only two targets 620 and 624 are shown, additional targets may be used.

The PVD tool 600 also includes a first power supply 630 coupled to the first target electrode 622 and a second power supply 632 coupled to the second target electrode 624. As is commonly understood, the power supplies 630 and 632 pulse direct current (DC) power to the respective electrodes, causing material to be, at least in some embodiments, simultaneously sputtered (i.e., co-sputtered) from the first and second targets 620 and 624.

During sputtering, inert gases, such as argon or krypton, may be introduced into the processing chamber 604 through the gas inlet 612, while a vacuum is applied to the gas outlet 614. However, in embodiments in which reactive sputtering is used, reactive gases may also be introduced, such as oxygen and/or nitrogen, which interact with particles ejected from the targets (i.e., to form oxides, nitrides, and/or oxynitrides).

Although not shown in FIG. 6, the PVD tool 600 may also include a control system having, for example, a processor and a memory, which is in operable communication with the other components shown in FIG. 6 and configured to control the operation thereof in order to perform the methods described herein.

Further, although the PVD tool 600 shown in FIG. 6 includes a stationary substrate support 606, it should be understood that in a manufacturing environment, the substrate 616 may be in motion (e.g., an inline configuration) during the various layers described herein.

Figure 7:
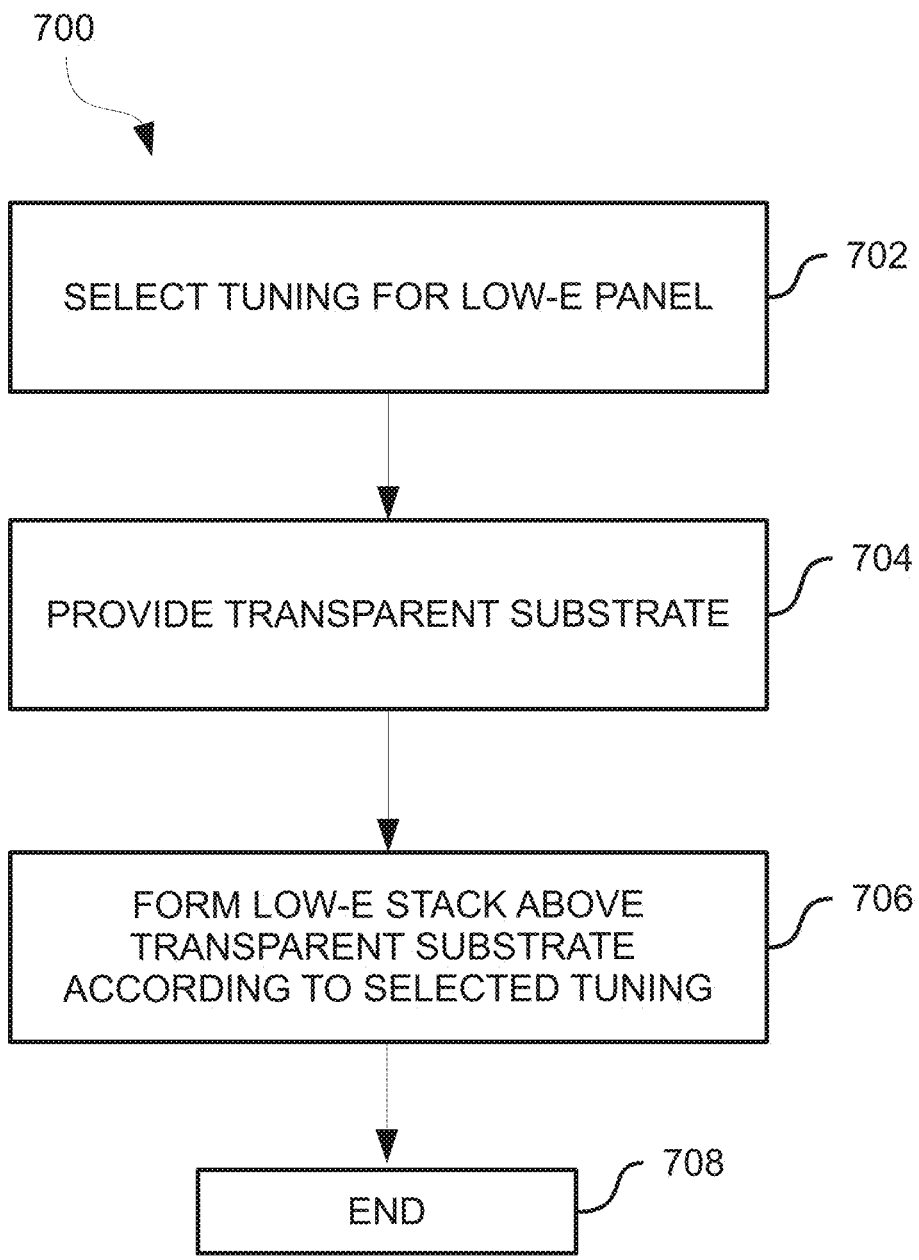
FIG. 7 is a flow chart illustrating a method for forming a low-e panel according to some embodiments.

FIG. 7 is a flow chart illustrating a method 700 for forming a low-e panel according to some embodiments. The method 700 begins at block 702 by selecting a "tuning" (i.e., performance characteristics) for the low-e panel to be formed. Exemplary tunings include minimal color change from heat treatment and maximum visible light transmission, such as described above.

At block 704, a transparent substrate, such as the examples described above (e.g., glass), is provided. At block 706, a low-e stack is formed above the transparent substrate in accordance with the selected tuning As described above, the selected tuning determines the thickness of at least some of the layers of the low-e stack, such as the reflective layers and the base layers. At block 708, the method ends.

Thus, in some embodiments, a method for forming a low-e panel is provided. A transparent substrate is provided. A first base layer is formed above the transparent substrate. The first base layer includes zinc and tin and has a thickness of between about 12 nm and about 50 nm. A first seed layer is formed above the first base layer. The first seed layer includes zinc and has a thickness of between about 2 nm and about 6 nm. A first reflective layer is formed above the first seed layer. The first reflective layer has a thickness of between about 8 nm and about 20 nm. A first barrier layer is formed above the first reflective layer. The first barrier layer includes niobium and has a thickness of between about 1 nm and about 8 nm. A second base layer is formed above the first barrier layer. The second base layer includes zinc and tin and has a thickness of between about 40 nm and about 80 nm. A second seed layer is formed above the second base layer. The second seed layer includes zinc and has a thickness of between about 2 nm and about 6 nm. A second reflective layer is formed above the second seed layer. The second reflective layer has a thickness of between about 8 nm and about 20 nm. A second barrier layer is formed above the second reflective layer. The second barrier layer includes niobium and has a thickness of between about 1 nm and about 8 nm. A third base layer is formed above the second barrier layer. The third base layer includes zinc and tin and has a thickness of between about 40 nm and about 80 nm. A third seed layer is formed above the third base layer. The third seed layer includes zinc and has a thickness of between about 2 nm and about 6 nm. A third reflective layer is formed above the third seed layer. The third reflective layer has a thickness of between about 8 nm and about 20 nm. A third barrier layer is formed above the third reflective layer.

The third barrier layer includes niobium and has a thickness of between about 1 nm and about 8 nm.

In some embodiments, a method for forming a low-e panel is provided. A transparent substrate is provided. The transparent substrate includes glass. A first base layer is formed above the transparent substrate. The first base layer includes zinc-tin oxide and has a thickness of between about 12 nm and about 50 nm. A first seed layer is formed above the first base layer. The first seed layer includes zinc oxide and has a thickness of between about 2 nm and about 6 nm. A first reflective layer is formed above the first seed layer. The first reflective layer includes silver and has a thickness of between about 8 nm and about 20 nm. A first barrier layer is formed above the first reflective layer. The first barrier layer includes nickel-titanium-niobium oxide and has a thickness of between about 1 nm and about 8 nm. A second base layer is formed above the first barrier layer. The second base layer includes zinc-tin oxide and has a thickness of between about 40 nm and about 80 nm. A second seed layer is formed above the second base layer. The second seed layer includes zinc oxide and has a thickness of between about 2 nm and about 6 nm. A second reflective layer is formed above the second seed layer. The second reflective layer includes silver and has a thickness of between about 8 nm and about 20 nm. A second barrier layer is formed above the second reflective layer. The second barrier layer includes nickel-titanium-niobium oxide and has a thickness of between about 1 nm and about 8 nm. A third base layer is formed above the second barrier layer. The third base layer includes zinc-tin oxide and has a thickness of between about 40 nm and about 80 nm. A third seed layer is formed above the third base layer. The third seed layer includes zinc oxide and has a thickness of between about 2 nm and about 6 nm. A third reflective layer is formed above the third seed layer. The third reflective layer includes silver and has a thickness of between about 8 nm and about 20 nm. A third barrier layer is formed above the third reflective layer. The third barrier layer includes nickel-titanium-niobium oxide and has a thickness of between about 1 nm and about 8 nm.

In some embodiments, a low-e panel is provided. The low-e panel includes a transparent substrate. A first base layer is formed above the transparent substrate. The first base layer includes zinc and tin and has a thickness of between about 12 nm and about 50 nm. A first seed layer is formed above the first base layer. The first seed layer includes zinc and has a thickness of between about 2 nm and about 6 nm. A first reflective layer is formed above the first seed layer. The first reflective layer has a thickness of between about 8 nm and about 20 nm. A first barrier layer is formed above the first reflective layer. The first barrier layer includes niobium and has a thickness of between about 1 nm and about 8 nm. A second base layer is formed above the first barrier layer. The second base layer includes zinc and tin and has a thickness of between about 40 nm and about 80 nm. A second seed layer is formed above the second base layer. The second seed layer includes zinc and has a thickness of between about 2 nm and about 6 nm. A second reflective layer is formed above the second seed layer. The second reflective layer has a thickness of between about 8 nm and about 20 nm. A second barrier layer is formed above the second reflective layer. The second barrier layer includes niobium and has a thickness of between about 1 nm and about 8 nm. A third base layer is formed above the second barrier layer. The third base layer includes zinc and tin and has a thickness of between about 40 nm and about 80 nm. A third seed layer is formed above the third base layer. The third seed layer includes zinc and has a thickness of between about 2 nm and about 6 nm. A third reflective layer is formed above the third seed layer. The third reflective layer has a thickness of between about 8 nm and about 20 nm. A third barrier layer is formed above the third reflective layer. The third barrier layer includes niobium and has a thickness of between about 1 nm and about 8 nm.

Although the foregoing examples have been described in some detail for purposes of clarity of understanding, the invention is not limited to the details provided. There are many alternative ways of implementing the invention. The disclosed examples are illustrative and not restrictive.

What is claimed is:
1. A low-e panel comprising:
a transparent substrate;
a first base layer formed above the transparent substrate, the first base layer comprising zinc and tin and having a thickness of between about 30 nanometers (nm) and about 35 nm;
a first seed layer formed above the first base layer, the first seed layer comprising zinc and having a thickness of between about 2 nm and about 6 nm;
a first reflective layer formed above the first seed layer, the first reflective layer having a thickness of between about 13 nm and about 14 nm;
a first barrier layer formed above the first reflective layer, the first barrier layer comprising nickel, titanium, and niobium and having a thickness of between about 1 nm and about 8 nm;
a second base layer formed directly on the first barrier layer, the second base layer consisting of zinc-tin oxide and having a thickness of between about 65 nm and about 75 nm;
a second seed layer formed directly on the second base layer, the second seed layer consisting of zinc oxide and having a thickness of between about 2 nm and about 6 nm;
a second reflective layer formed directly on the second seed layer, the second reflective layer having a thickness of between about 14 nm and about 15 nm;
a second barrier layer formed above the second reflective layer, the second barrier layer comprising nickel, titanium, and niobium and having a thickness of between about 1 nm and about 8 nm;
a third base layer formed directly on the second barrier layer, the third base layer consisting of zinc-tin oxide and having a thickness of between about 65 nm and about 70 nm;
a third seed layer formed directly on the third base layer, the third seed layer consisting of zinc oxide and having a thickness of between about 2 nm and about 6 nm;
a third reflective layer formed directly on the third seed layer, the third reflective layer having a thickness of between about 16 nm and about 17 nm;
a third barrier layer formed above the third reflective layer, the third barrier layer comprising nickel, titanium, and niobium and having a thickness of between about 1 nm and about 8 nm;
a first over-coating layer formed above the third barrier layer, wherein the first over-coating layer comprises zinc and tin and has a thickness of between about 10 nm and about 20 nm; and
a second over-coating layer formed above the first over-coating layer, wherein the second over-coating layer consists of zinc oxide and has a thickness of between about 3 nm and about 6 nm.

2. The low-e panel of claim 1, wherein the low-w panel exhibits a $R_g \Delta E^*$ value of less than 2.00 after a heat treatment.

3. The low-e panel of claim 1, wherein each of the first reflective layer, the second reflective layer, and the third reflective layer comprises silver, and the transparent substrate comprises glass.

4. The low-e panel of claim 1, wherein the first barrier layer is formed directly on the first reflective layer is formed directly on the first reflective layer and consists of nickel-titanium-niobium oxide, the second barrier layer is formed directly on the second reflective layer and consists of nickel-titanium-niobium oxide, and the third barrier layer is formed directly on the third reflective layer and consists of nickel-titanium-niobium oxide.

5. The low-e panel of claim 4, wherein the first reflective layer is formed directly on the first seed layer, the first seed layer is formed directly on the first base layer and consists of zinc oxide, and the first base layer consists of zinc-tin oxide.

6. The low-e panel of claim 4, wherein each of the first reflective layer, the second reflective layer, and the third reflective layer consists of silver.

7. A low-e panel comprising:
a transparent substrate;
a first base layer formed above the transparent substrate, the first base layer consisting of zinc-tin oxide and having a thickness of between about 30 nanometers (nm) and about 35 nm;
a first seed layer formed directly on the first base layer, the first seed layer consisting of zinc oxide and having a thickness of between about 2 nm and about 6 nm;
a first reflective layer formed directly on the first seed layer, the first reflective layer consisting of silver and having a thickness of between about 13 nm and about 14 nm;
a first barrier layer formed directly on the first reflective layer, the first barrier layer consisting of nickel-titanium-niobium oxide and having a thickness of between about 1 nm and about 8 nm;
a second base layer formed directly on the first barrier layer, the second base layer consisting of zinc-tin oxide and having a thickness of between about 65 nm and about 75 nm;
a second seed layer formed directly on the second base layer, the second seed layer consisting of zinc oxide and having a thickness of between about 2 nm and about 6 nm;
a second reflective layer formed directly on the second seed layer, the second reflective layer consisting of silver and having a thickness of between about 14 nm and about 15 nm;
a second barrier layer formed directly on the second reflective layer, the second barrier layer consisting of nickel-titanium-niobium oxide and having a thickness of between about 1 nm and about 8 nm;
a third base layer formed directly on the second barrier layer, the third base layer consisting of zinc-tin oxide and having a thickness of between about 65 nm and about 70 nm;
a third seed layer formed directly on the third base layer, the third seed layer consisting of zinc oxide and having a thickness of between about 2 nm and about 6 nm;
a third reflective layer formed directly on the third seed layer, the third reflective layer consisting of silver and having a thickness of between about 16 nm and about 17 nm;
a third barrier layer formed directly on the third reflective layer, the third barrier layer consisting of nickel-titanium-niobium oxide and having a thickness of between about 1 nm and about 8 nm;
a first over-coating layer formed above the third barrier layer, wherein the first over-coating layer consists of zinc-tin oxide and has a thickness of between about 10 nm and about 20nm; and
a second over-coating layer formed above the first over-coating layer, wherein the second over-coating layer consists of zinc oxide and has a thickness of between about 3 nm and about 6 nm.

8. The low-e panel of claim 7, wherein the first base layer is formed directly on the transparent substrate.

9. The low-e panel of claim 7, further comprising a protective layer formed directly on the second over-coating layer, wherein the protective layer consists of silicon nitride and has a thickness of between about 10 nm and about 30 nm.

10. The low-e panel of claim 7, wherein the transparent substrate comprises glass.

11. The low-e panel of claim 7, wherein the low-w panel exhibits a $R_g \Delta E^*$ value of less than 2.00 after a heat treatment.

* * * * *